(12) United States Patent
Adolfsson et al.

(10) Patent No.: US 8,376,407 B2
(45) Date of Patent: Feb. 19, 2013

(54) OCCUPANT RESTRAINT SYSTEM WITH BELT PRE-TENSIONER

(75) Inventors: Peter Adolfsson, Hisings Backa (SE); Gert Aldeborg, Uddevalla (SE)

(73) Assignee: Volvo Car Corporation, Goeteborg (SE)

( * ) Notice: Subject to any disclaimer, the term of this patent is extended or adjusted under 35 U.S.C. 154(b) by 0 days.

(21) Appl. No.: 13/406,802

(22) Filed: Feb. 28, 2012

(65) Prior Publication Data
US 2012/0217733 A1 Aug. 30, 2012

(30) Foreign Application Priority Data

Feb. 28, 2011 (EP) ................................. 11156164

(51) Int. Cl.
*B60R 22/46* (2006.01)
(52) U.S. Cl. ......... 280/806; 280/808; 180/268; 297/480
(58) Field of Classification Search .......... 280/806–808, 280/801.2, 804; 180/268; 297/480, 483
See application file for complete search history.

(56) References Cited

U.S. PATENT DOCUMENTS

| | | | |
|---|---|---|---|
| 3,901,531 A | 8/1975 | Prochazka | |
| 4,166,642 A * | 9/1979 | Jahn et al. | 280/806 |
| 5,135,257 A | 8/1992 | Short | |
| 5,544,917 A * | 8/1996 | Loxton et al. | 280/801.2 |
| 5,749,601 A * | 5/1998 | Knoll et al. | 280/805 |
| 6,527,298 B2 * | 3/2003 | Kopetzky | 280/806 |
| 6,705,645 B2 * | 3/2004 | Motozawa et al. | 280/806 |
| 7,137,648 B2 * | 11/2006 | Schulz et al. | 280/805 |
| 7,331,610 B2 * | 2/2008 | Herrmann | 280/806 |
| 7,618,097 B2 * | 11/2009 | Ghatge | 297/473 |
| 2002/0089164 A1 | 7/2002 | Rouhana et al. | |
| 2006/0289220 A1 * | 12/2006 | Oota et al. | 180/274 |
| 2012/0217787 A1 * | 8/2012 | Adolfsson et al. | 297/480 |

FOREIGN PATENT DOCUMENTS

DE 10045328 A1 5/2001

\* cited by examiner

*Primary Examiner* — Drew Brown
(74) *Attorney, Agent, or Firm* — Brooks Kushman P.C.

(57) ABSTRACT

A seat belt system for a vehicle has a shoulder-belt extending diagonally across the seat. A belt tensioner applies tension to the belt in response to detection/prediction of a potentially unsafe situation by a safety sensor/control system. A support arm has an upper end mounted to the vehicle structure above an upper outboard portion of the seat. The support arm extends downwardly and a guide member is attached to the lower end of the support arm and engages the belt. The lower end of the support arm is movable relative to the upper end/mounting point such that when the tensioner is activated, the belt urges the guide member from a comfort position relatively far from the neck and/or upper shoulder of a seat occupant to a safety position closer to the seat.

20 Claims, 10 Drawing Sheets

OCCUPANT RESTRAINT SYSTEM WITH BELT PRE-TENSIONER

CROSS-REFERENCE TO RELATED APPLICATIONS

This application claims foreign priority benefits under 35 U.S.C. §119(a)-(d) to EP 11156164.3, filed Feb. 28, 2011, the disclosure of which is hereby incorporated by reference in its entirety.

TECHNICAL FIELD

The present disclosure relates to an occupant restraint system for a vehicle seat, and particularly to an occupant restraint system having a belt pre-tensioner system.

BACKGROUND

Vehicle seats of today, such as seats for cars, trucks, aircraft, et cetera, are often furnished with one or more occupant restraint systems that most commonly include one or more seat belts. Generally, a front seat of a vehicle is provided with one seat belt system whereas a vehicle back seat, since it is typically a bench seat, may be provided with a plurality of seat belt systems, one for each seating position.

Occupant restraint systems also often comprise a safety belt tensioner (sometimes also referred to as a pre-tensioner) operative to tension the seat belt in preparation for a vehicle acceleration/deceleration (to include a collision) to thereby reduce the motion of an occupant of the seat equipped with the occupant restraint system. Moreover, the reversible tensioning of the safety belt may be used to haptically communicate to the occupant that the vehicle may be about to be involved in a collision.

In order to protect an occupant of a vehicle seat in an appropriate manner, the seat belt generally has to assume a suitable safety belt configuration prior to, or at least during the initial portion of, the possible deceleration. For instance for three-point or four-point belts, such a suitable safety belt configuration generally implies that a portion of the safety belt which extends diagonally downwards across the occupant's torso is located close to the neck of the occupant.

However, the above position of the diagonally extending portion of the safety belt (often referred to as the "shoulder-belt") generally results in reduced comfort for the occupant. For example, the shoulder-belt portion of the safety belt may rub against the neck of the occupant. As such, it would be desirable to obtain a safety configuration and a comfort configuration of an occupant restraint system for a vehicle.

SUMMARY

In one disclosed embodiment, an occupant restraint system for a vehicle seat comprises a belt having a shoulder-belt portion extending diagonally across the seat, and a belt tensioner applying tension to the belt in response to detection or prediction of a potentially unsafe situation by a safety sensor/control system. A support arm has an upper end mounted to a portion of the vehicle structure above an upper outboard portion of the seat, for example adjacent to a side wall or a B- or C-pillar of the vehicle. The support arm extends downwardly from the mounting point and a guide member is attached to the lower end of the support arm. The guide member engages the belt to allow the belt to slide along the guide member during refraction and extension. The lower end of the support arm is movable relative to the upper end/ mounting point such that when the belt tensioner applies tension to the belt, the belt urges the guide member toward the seat in a direction having a component coinciding with an inboard direction. The guide member and support arm thereby allow the belt to remain in a comfort position relatively far from the neck and/or upper shoulder of a seat occupant during normal vehicle operation, and move to a safety position when the belt tensioner is activated in recognition or anticipation of a vehicle condition that may require that the occupant be more securely restrained in the seat.

In another disclosed embodiment, the lower end of the support arm is movable relative to the upper end such that when the belt tensioner applies tension to the belt, the guide member moves in a direction further having a component coinciding with a backward direction.

In another disclosed embodiment, the seat belt safety system further comprises a biasing element acting on at least one of the support arm and the guide member to resist movement of the guide member when the safety belt tensioner apples tension to the belt.

In another disclosed embodiment, the support arm is adapted for pivoting mounting to the vehicle structure at a pivot point, the support arm rotating about a pivot point to allow the movement of the guide member.

In another disclosed embodiment, the support arm is adapted for non-pivoting mounting to the vehicle structure and is constructed to deflect to allow the movement of the guide member.

In another disclosed embodiment, an occupant restraint system for use with a vehicle seat comprises a belt having a shoulder-belt portion extending diagonally across the sea, a belt tensioner applying tension to the belt in response to safety sensor/control system, and a support arm having an upper end adapted for pivoting mounting to vehicle structure at a pivot point above an upper outboard portion of the seat. The support arm extends downward from the pivot point, and a guide member is attached to a lower end of the support arm and engages the belt to allow the belt to slide along the guide member during refraction and extension. The guide member is movable along with the support arm between a comfort position wherein the guide member is relatively farther outboard of the seat and a safety position wherein the guide member is relatively closer to the seat. A torsion spring is located at the pivot point and applies a biasing force to the support arm urging the support arm toward the comfort position. The biasing force is overcome when the belt tensioner applies tension to the belt such that the guide member moves toward the safety position.

BRIEF DESCRIPTION OF THE DRAWINGS

The present invention will hereinafter be explained in greater detail by means of non-limiting examples and with reference to the appended drawings in which.

It should be noted that the appended drawings are not necessarily drawn to scale and that the dimensions of some features of the present invention may have been exaggerated for the sake of clarity.

DETAILED DESCRIPTION

The invention will, in the following, be exemplified by embodiments. It is to be understood, however, that the embodiments are included in order to explain principles of the invention and not to limit the scope of the invention defined by the appended claims.

Figure 1:
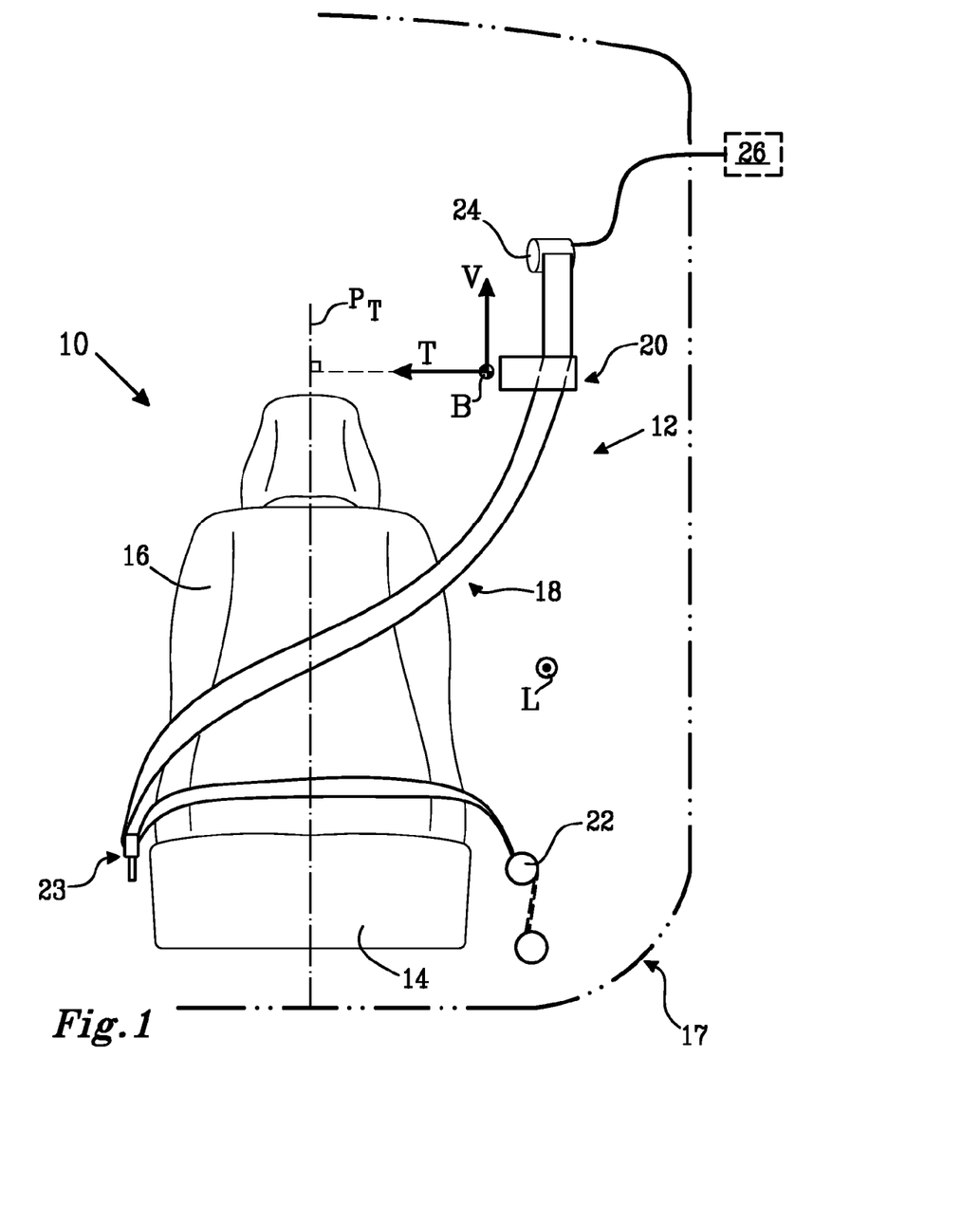
FIG. 1 shows an embodiment of an occupant restraint system in a comfort configuration.

FIG. 1 illustrates a seat 10 provided with an embodiment of an occupant restraint system 12 according to the present invention. The seat 10 comprises a bottom portion 14 and a backrest portion 16. The seat 10 has a vertical dimension along a vertical axis V and a transverse dimension along a transverse axis T. As may be seen in FIG. 1, the vertical axis V is directed from the bottom portion 14 towards the backrest portion 16 of the seat 10. The seat 10 and the occupant restraint system 12 are preferably located in a vehicle 17 such as a car.

Moreover, the seat 10 has a vertically extending transverse center plane $P_T$ which, when a person occupies the seat, extends between the occupant's left and right hand sides. The seat 10 also has a longitudinal axis L which is perpendicular to both the vertical axis V and the transverse axis T.

When the seat 10 is mounted in a vehicle (not shown in FIG. 1), the longitudinal axis L generally coincides with the intended direction of travel of the vehicle. In such an implementation of the seat 10, the transverse center plane $P_T$ extends in a vertical direction and in the intended direction of travel of the vehicle.

As may be seen in FIG. 1, the occupant restraint system 12 comprises a belt 18, an upper guide arrangement 20 and a second guide arrangement 22. Moreover, the occupant restraint system 12 is configured such that when the occupant restraint system 12 is mounted with a seat 10, the upper and second guide arrangements 20, 22 are located on the same side of the transverse center plane $P_T$ and the upper guide arrangement 20 is located above—i.e. on a higher level in the vertical direction V than—the second guide arrangement 22.

As used herein, the expression "guide arrangement" refers to those portions of the occupant restraint system which allows the safety belt to deflect, i.e. change direction as the belt passes over or through a guide.

FIG. 1 further illustrates that the transverse axis T is perpendicular to the transverse center plane $P_T$ and extends in a direction from the upper guide arrangement 20 towards the transverse center plane $P_T$. Moreover, FIG. 1 also illustrates that the system 12 comprises a backward direction B extending from the upper guide arrangement 20 in a direction perpendicular to both the vertical direction V and the transverse direction T such that vertical direction V, the transverse direction T and the backward direction B together form a right-handed coordinate system.

As may be realized from FIG. 1, the backward direction B is generally the inverse direction of the longitudinal axis L. As such, when the seat 10 is mounted in a vehicle 17, the backward direction B generally is the inverse direction of the intended direction of travel of the vehicle.

The upper guide arrangement 20 may be attached to a portion of the vehicle structure adjacent to the upper portion or corner of the seat back 16, as shown, such as an outboard sidewall or a roof support pillar. For example, in the case where seat 10 is a seat for a vehicle driver or front row passenger, the upper guide arrangement may be connected to the vehicle B-pillar. Alternatively, upper guide arrangement 20 may be attached to the seat 10.

Moreover, the FIG. 1 embodiment of the present invention comprises a third guide arrangement 23 and the illustrated occupant restraint system 12 is configured such that when the occupant restraint system is mounted with a seat 10, the third guide arrangement 23 is located on the opposite side of the transverse center plane $P_T$ as compared to the upper and second guide arrangements 20, 22.

Further, the occupant restraint system 12 further comprises a safety belt tensioner 24 adapted to tension the belt 18 in preparation for the vehicle being subjected to an acceleration/deceleration event or other actual or impending condition or situation which may indicate that the occupant should be securely restrained in the seat. In the embodiment of the present invention illustrated in FIG. 1, the safety belt tensioner 24 is located by the upper guide arrangement 20 such that—when following the extension of the safety belt 18 from the safety belt tensioner—components of the occupant restraint system 12 are arranged in the following order: the safety belt tensioner 24, the upper guide arrangement 20, the third guide arrangement 23 and the second guide arrangement 22. However, other embodiments of the present invention may have the components arranged in another order. Purely by way of example, the safety belt tensioner 24 may be located adjacent to the second guide arrangement 22. Furthermore, the safety belt 18 of the occupant restraint system 12 may be connected to more than one safety belt tensioner (not shown in FIG. 1).

Moreover, in the FIG. 1 embodiment of the present invention, the safety belt tensioner 24 is located above the upper guide arrangement 20. However, in other embodiments of the present invention, the safety belt tensioner 24 may be located on the same level, or below, the upper guide arrangement 20.

When the occupant restraint system 12 is in its operative condition (as shown in FIG. 1), the safety belt 18 is fastened so that a diagonal cross-seat portion of the safety belt extends diagonally (both laterally and vertically) across the backrest 16 between upper guide arrangement 20 and third guide arrangement 23. This diagonal cross-seat portion is commonly referred to as a "shoulder-belt" to distinguish it from the lower portion of the belt that extends across the seat bottom portion 14 between lower guide arrangements 22 and 23 (the "lap-belt"). It may often be the case, however, that the entire belt 18 (both the shoulder-belt and the lap-belt) is a single, contiguous length of material.

The safety belt tensioner 24 may be implemented in a many different ways. Purely by way of example, the safety belt tensioner may be actuated by pyrotechnic, hydraulic and/or electric means in order to tighten or apply tension to, often by retraction of, the safety belt 18. Generally, the safety belt tensioner is in communication with a safety sensor/control system 26. Safety sensor/control system 26 may comprise one or more devices for sensing an actual or impending situation which may call for the occupant to be securely restrained in the seat. Examples of such devices include accelerometers, crush/intrusion detectors, and all manner of remote/non-contact sensors (optical, radar, lidar, sonar, etc.) for predicting or detecting an impending collision or other potentially unsafe condition. Safety sensor/control system 26 may also include a Restraints Control Module or other electronic controller that receives signals from one or more sensors and applies programmed instructions and logic to make safety system actuation decisions and control the operation of one or more safety systems, to include the present occupant restraint system.

Depending on the implementation thereof, the safety belt tensioner 24 may be adapted to reversibly or irreversibly tension the belt 18. Purely by way of example, the safety belt tensioner 24 may be adapted to tension the safety belt 18 such that a tension force of approximately 2 kN is obtained in the belt 18.

In an implementation of the safety sensor/control system 26 and the safety belt tensioner 24 assembly, the safety sensor/control system 26 detects an imminent and/or occurring situation that may require more secure occupant restraint than is provided by the comfort condition. Whenever such a situation is detected, the safety sensor/control system 26 may communicate with the safety belt tensioner 24 such that it is actuated to tension the safety belt 18.

Figure 2:
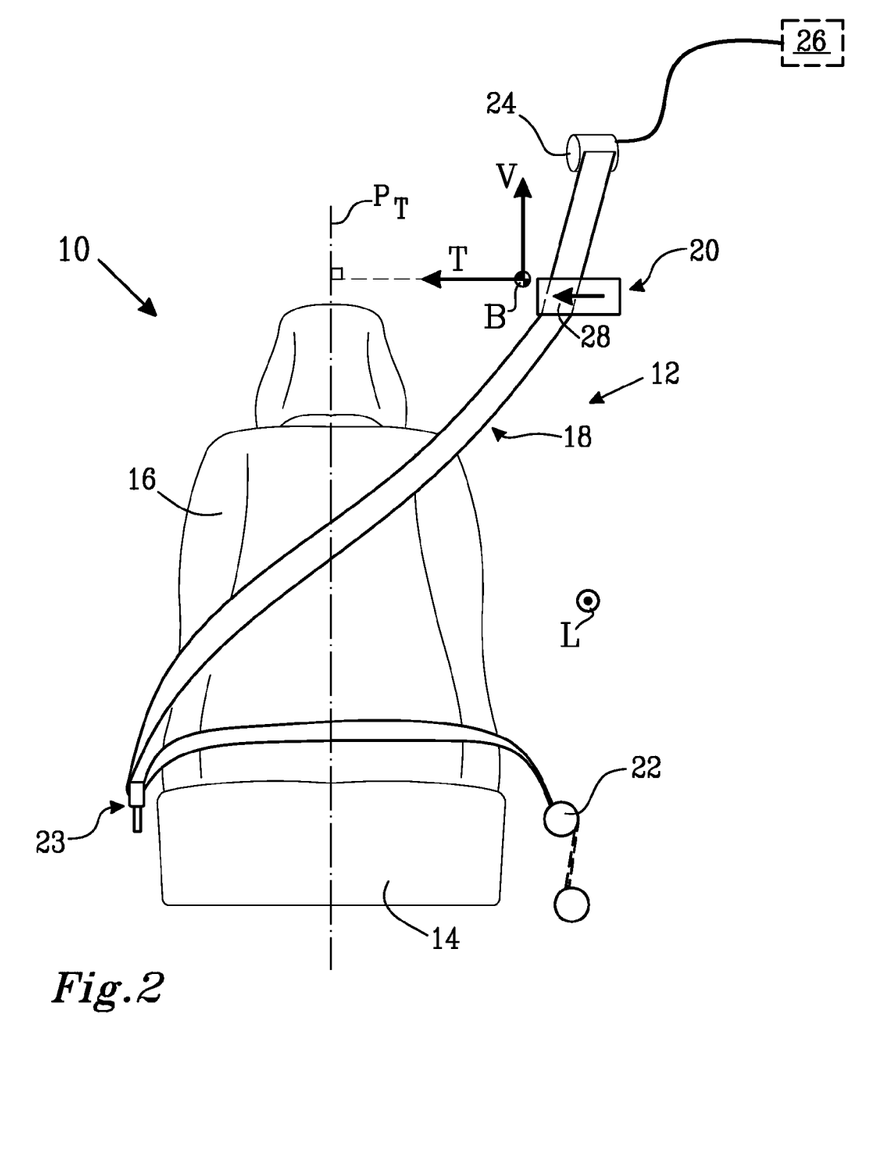
FIG. 2 shows the FIG. 1 embodiment in a safety configuration.

FIG. 2 illustrates the FIG. 1 embodiment of the present invention when the safety belt tensioner 24 has been actuated. As may be seen in FIG. 2, the upper guide arrangement 20 is configured such that it allows an upper end 28 of the shoulder-belt portion of the belt 18, which upper end 28 is in contact with the upper guide arrangement 20, to be displaced in a direction at least partially coinciding with the transverse direction T and/or the backward direction B.

In the embodiment illustrated in FIG. 2, the upper end 28 of shoulder-belt portion is arranged to be displaced at least partially towards the transverse center plane $P_T$ in the transverse direction T when the belt pre-tensioning system is activated in response to a safety system determining that vehicle 17 is (or is about to be) involved in situation requiring more secure restraint of the seat occupant.

When the safety belt tensioner 22 tensions the belt 18, the belt assumes a safety configuration which is appropriate from an injury prevention point of view since a shoulder-belt portion of the safety belt which is adapted to extend diagonally across the backrest 16 (and hence diagonally across the seat occupant's torso) will be moved inboard (away from a portion on the vehicle structure to which the guide arrangement 20 is mounted) such that its upper portion will be located closer to the neck of the occupant, as compared to the comfort configuration illustrated in FIG. 1.

In order to obtain an appropriate distinction between the comfort configuration and the safety configuration, the upper guide arrangement 20 may be adapted to allow a displacement of the upper end 28 of shoulder-belt portion in a direction at least partially coinciding with the transverse direction T and/or the backward direction B which is at least 0.2 times, preferably at least 0.4 times and more preferred at least 0.6 times, the width of the belt portion 28. To this end, it should be noted that a safety belt may generally have a width of 4-8 cm.

Figure 3:
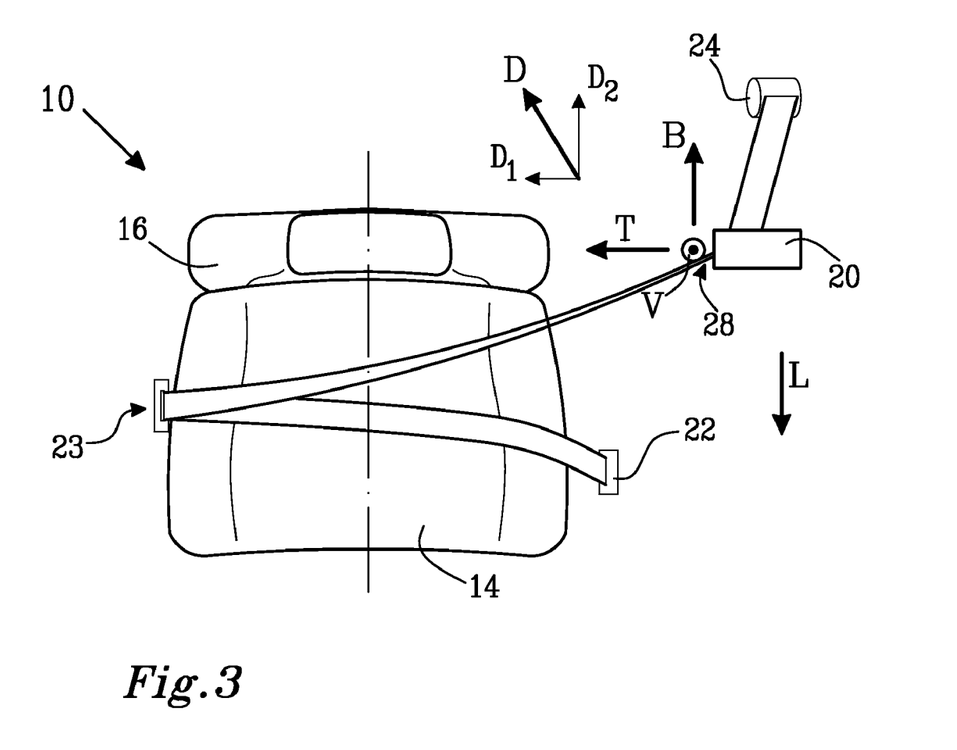
FIG. 3 shows a portion of the FIG. 1 embodiment, as seen from above.

FIG. 3 is a top view of a portion of the FIG. 1 seat 10 with the occupant restraint system and illustrates a displacement direction D having a first horizontal component $D_1$ which coincides with, i.e. is parallel with and extends in the same direction as, the transverse direction T and a second horizontal component $D_2$ which coincides with the backward direction B. As such, a displacement direction which is "at least partially coinciding with the transverse direction T and/or said backward direction B" is intended to encompass displacement directions D wherein:

the displacement direction D has a horizontal component which coincides with the transverse direction T;

the displacement direction D has a horizontal component which coincides with the backward direction B, or the displacement direction D has a first horizontal component $D_1$ which coincides with the transverse direction T and a second horizontal component $D_2$ which coincides with the backward direction B.

A "horizontal component" is intended to encompass components which extend in a direction perpendicular to the vertical axis V.

The upper shoulder-belt portion 28 may, in some embodiments, be displaced in a displacement direction D which also has a vertical component, i.e. a component which is parallel to the vertical direction V. In the embodiments presented hereinbelow, the displacement direction is generally coinciding with the transverse direction T but any one of the below embodiments could be adjusted so as to achieve a displacement direction D which coincides with the backward direction B or which has a first component $D_1$ which coincides with the transverse direction T and a second component $D_2$ which coincides with the backward direction B.

Figure 4A:
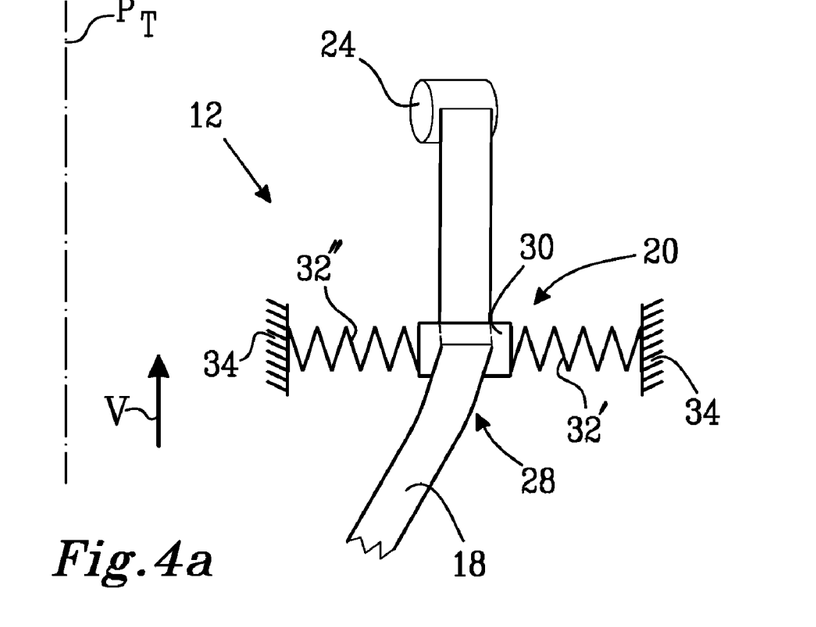
FIG. 4a-4b shows a portion of another disclosed embodiment of an occupant restraint system.
Figure 4B:
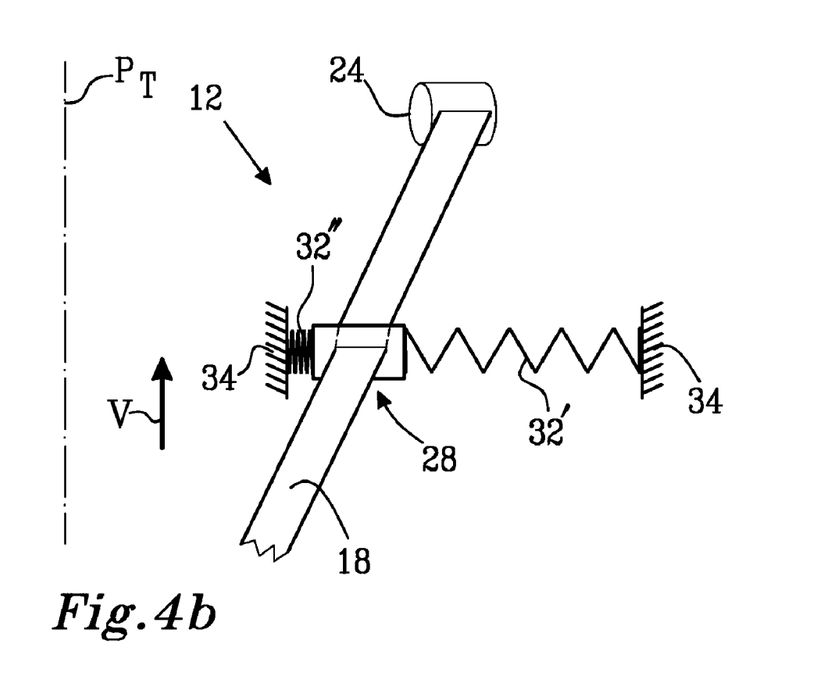

FIG. 4a and FIG. 4b illustrate a portion of an embodiment of an occupant restraint system in a comfort configuration. The occupant restraint system 12 comprises an upper guide arrangement 20 which in turn comprises a guide member 30. The guide member 30 is in FIG. 4a implemented as a "keeper" through which the safety belt 18 runs, the belt 18 being free to slide along or through the guide member during retraction and extension of the belt. The keeper may have a closed perimeter such that it completely surrounds the safety belt 18 or it may include an opening in its perimeter such that the belt may be moved into and out of engagement with the keeper. If the keeper is open, the opening thereof preferably faces away from the transverse center plane $P_T$. The FIG. 4a embodiment further comprises a biasing element, which is implemented as two springs 32', 32" connected to the guide member 30. FIG. 4a also illustrates that the biasing element extends between the guide member 30 and a support member 34. As such, the two springs 32', 32" may be regarded as forming part of a compliant portion of the upper guide arrangement 20 in the FIG. 4a and FIG. 4b embodiment.

The compliant portion of the upper guide arrangement allows the portion of the belt engaged by the guide member to be displaced in a direction at least partially coinciding with the transverse direction and/or the backward direction when the reversible safety belt tensioner tensions the belt.

As used herein, the expression "compliant portion" encompasses any portion of the upper guide arrangement that allows a displacement of the belt portion in response the tensioning of the belt. As such, the expression "compliant portion" is not intended to encompass any actuator or the like which may be actuated so as to actively displace the belt portion.

The support member 34 may be (or may be rigidly connected to) at least one of a component of the upper guide arrangement 20, the seat 10 or another portion of a vehicle structure adjacent to the upper outboard corner the seat backrest 16 (not shown). In the implementation of the biasing element illustrated in FIG. 4a, the springs 32', 32" extend substantially horizontally, i.e. in a direction substantially perpendicular to the vertical direction V, and the biasing element comprises an inner spring 32" located between the guide member 30 and the transverse center plane $P_T$ and an outer spring 32' which is located on the opposite side of the guide member 30.

The use of a biasing element in the upper guide arrangement implies that the upper guide arrangement may be reversible, i.e. that the upper guide arrangement may reassume or return to a position corresponding to a comfort configuration of the occupant restraint system when the seat belt tensioner is no longer applying tension to the belt.

FIG. 4b illustrates the FIG. 4a embodiment when the safety belt tensioner 24 has been actuated so as to apply tension to the safety belt 18. As may be seen in FIG. 4b, following the tensioning of the safety belt 18, the inner spring 32" is compressed whereas the outer spring 32' is extended such that the guide member 30 is displaced towards the transverse center plane $P_T$.

Figure 5A:
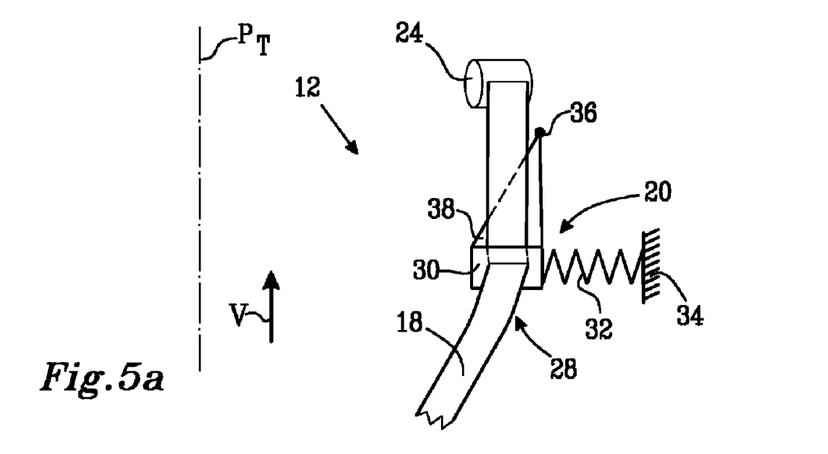
FIG. 5a-5c shows a portion of a further disclosed embodiment of an occupant restraint system.
Figure 5B:
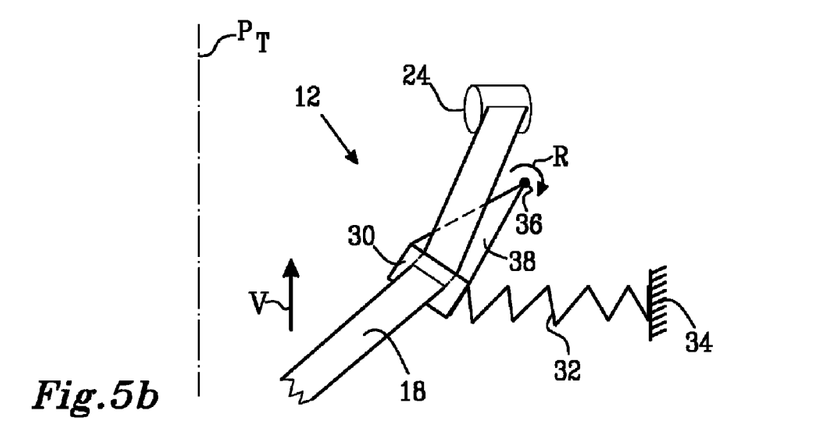

FIG. 5a and FIG. 5b illustrate a portion of another embodiment of a safety belt comprising a support arm 38 pivotally mounted at its upper end to a portion of the vehicle structure (such as, for example, a B-pillar) at a pivot point 36. Support arm 38 extends generally downward and the guide member 30, which again is implemented as a keeper, is attached to a lower end of the support arm 38. The geometry and mounting configuration of support arm 38 are such that the guide member 30 is located below pivot point 36 and in the desired comfort position. A biasing element 32 is connected to the guide member 30 or to the support arm 38, either directly or indirectly, such that the guide member 30 may be kept substantially in the comfort position illustrated in FIG. 5a during normal driving conditions.

Figure 5C:
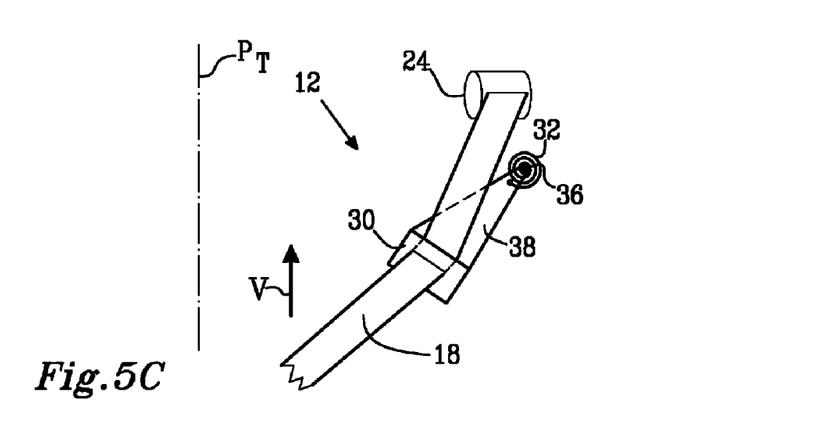

When the safety belt tensioner 24 is actuated to apply tension to the safety belt 18, the biasing element 32 yields or deflects to allow the support arm 38 and attached guide member 30 to pivot about point 36 in a direction as indicated by arrow R. The implementation of the biasing element 32 illustrated in FIG. 5b is a spring directly or indirectly connected with the guide member 30 or support arm 38 and a support member 34. FIG. 5c illustrates an alternative implementation wherein the biasing element 32 is a torsion spring located adjacent to pivot point 36 and acting on the support arm 38. In one implementation of a torsion spring arrangement, one end of the torsion spring may be connected to the guide member 30 whereas the other may be connected to a support member, such as a portion of the upper guide arrangement 20, which is prevented from rotation around the pivot 36.

As such, the biasing element 32, for instance the torsion spring in FIG. 5c, may be regarded as forming part of a compliant portion of the upper guide arrangement 20 in the FIGS. 5a to 5c embodiment.

Figure 6A:
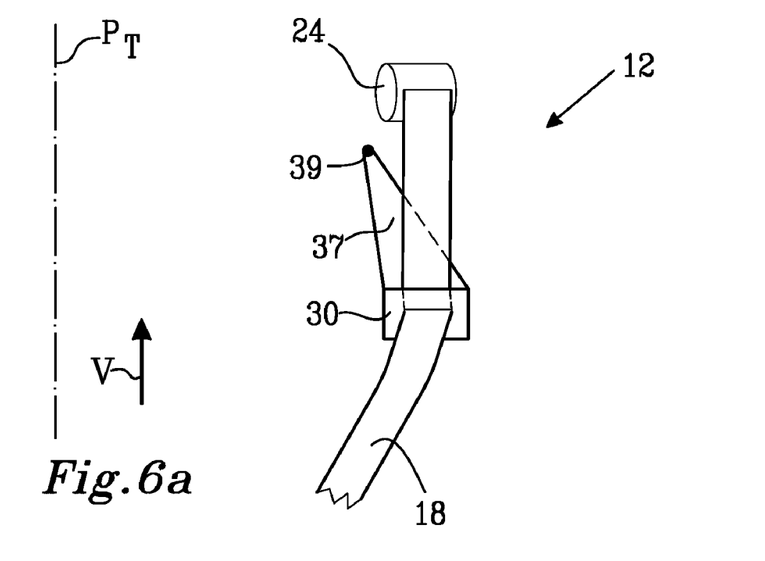
FIG. 6a-6b shows a portion of another embodiment of an occupant restraint system.
Figure 6B:
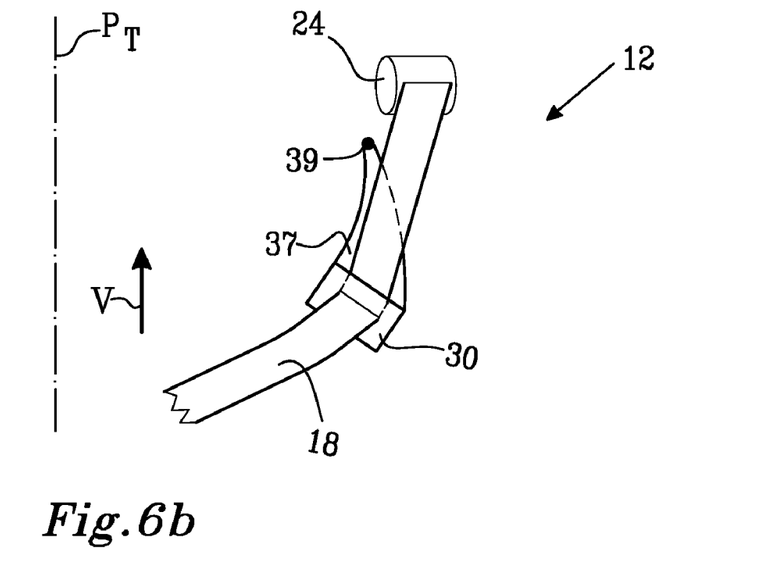

FIGS. 6a and 6b show an alternative to a pivoting support arm as discussed hereinabove wherein a guide member 30 is connected to a deflectable support arm 37 having its upper end non-pivotally mounted to a portion of the vehicle structure by a connection means 39, such as bolt, rivet, weld joint, et cetera. Purely by way of example, the deflectable support arm 37 may be made of a plastics material and/or a metal and is adapted to bend or deflect inwards and/or backwards, e.g. in a direction towards the transverse center plane $P_T$, when the safety belt tensioner 24 tensions the safety belt 18. The support arm 37 is shown in the bent or deflected condition in FIG. 6b.

As such, the deflectable support arm 37 may be regarded as forming part of a compliant portion of the upper guide arrangement 20 in the FIG. 6a and FIG. 6b embodiment.

Figure 7A:
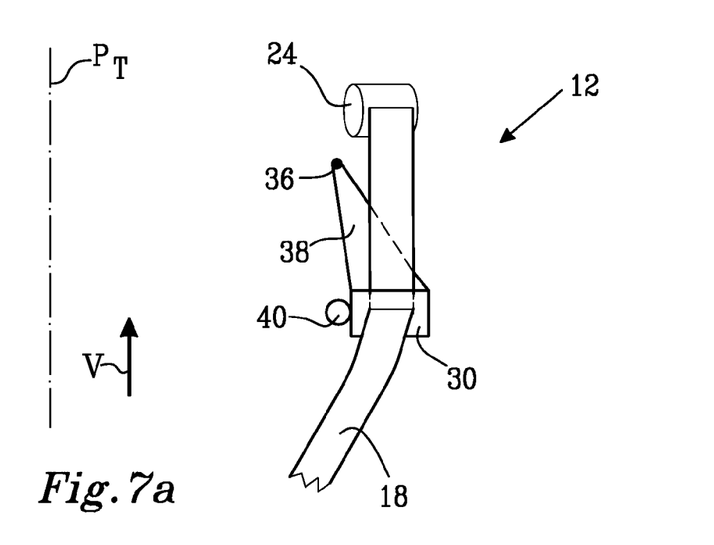
FIG. 7a-7b shows a portion of a further embodiment of an occupant restraint system.
Figure 7B:
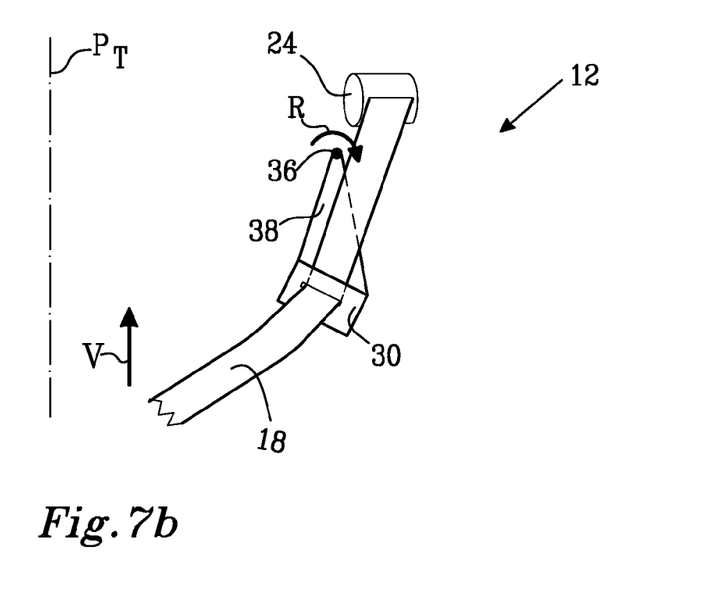

FIGS. 7a and 7b illustrate a portion of a further embodiment of an occupant restraint system comprising a guide member 30, again exemplified by a closed or open keeper, pivotally connected to a pivot point 36 via a support arm 38. This embodiment further comprises a locking member 40, exemplified as a breakable pin in FIGS. 7a and 7b, adapted to physically block displacement of the guide member 30 towards the transverse center plane $P_T$ during normal driving conditions, i.e. when the safety belt tensioner has not been activated. The locking member 40 may be regarded as forming part of a compliant portion of the upper guide arrangement 20 in the FIGS. 7a and 7b embodiment.

In the implementation of the locking member 40 illustrated in FIGS. 7a and 7b, the locking member 40 is located so as to contact a portion of the guide member 30, but in other implementations, the locking member 40 may be in contact, directly or indirectly, with the support arm 38 or other portions of the upper guide arrangement 20 to thereby prevent a displacement of the guide member 30 towards the transverse center plane $P_T$.

FIG. 7b illustrates a portion of the present embodiment when the safety belt tensioner has been actuated 24 to apply tension to the safety belt 18. The tensioning of the safety belt 18 imparts a load on the locking member 40 which results in that the locking member 40 breaking so that guide member 30 is free to rotate in the direction R about pivot point 36 towards the transverse center plane $P_T$.

Purely by way of example, the guide member 30 and the support arm 38 may be made of a plastics material and may also form a unitary component. Moreover, and again purely by way of example, the support arm 38 may have length, i.e. an extension between the pivot 36 and the guide member 30, such that the distance from the pivot 36 to the guide member 30 is within the range of 5-20 cm, preferably within the range of 8-15 cm.

It should be noted that although the locking member 40 has been exemplified by a break pin in FIGS. 7a and 7b, the locking member 40 may be implemented in other ways in other embodiments of the present invention. Purely by way of example, the locking member 40 may comprise a locking device such as a pawl (not shown) which retains the guide member 30 in position during normal driving conditions. Such a locking device may be in communication with the FIG. 1 safety sensor/control system 26. As such, if a situation calling for improved occupant restraint is detected, the safety sensor/control system 26 may communicate with the locking device such that the guide member 30 is released and subsequently displaced towards the transverse center plane $P_T$.

It should be noted that a locking member 40 as described hereinabove may be used instead of, or in addition to, the biasing element in any one of the embodiments of the present invention illustrated in FIG. 4a to FIG. 7b.

Figure 8A:
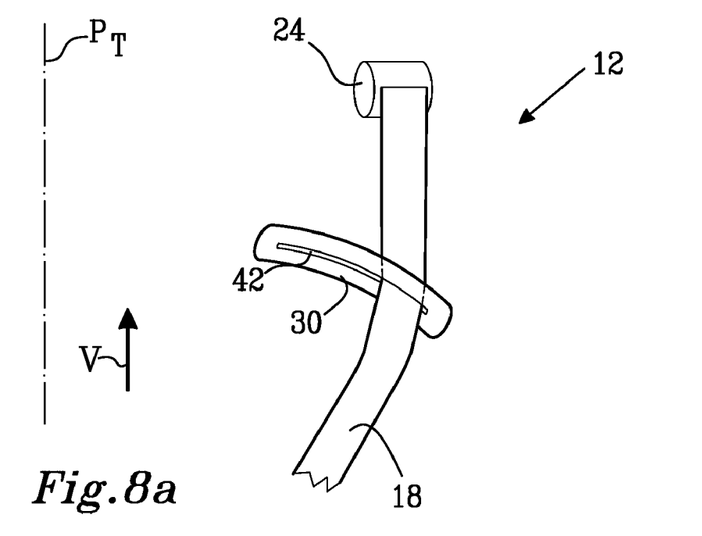
FIG. 8a-8b shows a portion of another embodiment of an occupant restraint system.
Figure 8B:
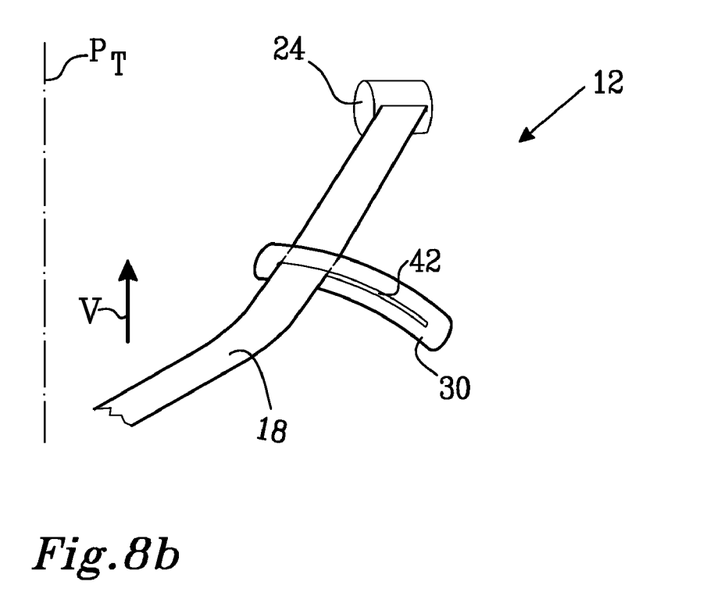

FIGS. 8a and 8b illustrate a portion of a further embodiment of an occupant restraint system comprising guide member 30 having a slot 42 through which a portion of the safety belt 18 extends. The slot 42 has a dimension in at least a direction perpendicular to the transverse center plane $P_T$ which dimension is at least 2 times, preferably 3 times, greater than the width of the belt. Moreover, the FIG. 8a slot 42 preferably is inclined in relation to a horizontal plane, i.e. a plane extending perpendicular to the vertical direction V, such that the portion of the slot 42 which is located towards the transverse center plane $P_T$ is above, i.e. on a higher elevation in the vertical axis, than the portion of the slot 42 which is located away from the transverse center plane $P_T$. In the implementation if the slot 42 illustrated in FIG. 8a, the slot 42 is arcuate.

During normal driving conditions, the safety belt 18 is, due to friction forces between the safety belt 18 and the circumference of the slot 42, kept in a position as illustrated in FIG. 8a. Thus, the safety belt 18 is retained in a portion of the slot 42 which is located away from the transverse center plane $P_T$. When the safety belt tensioner 24 tensions the belt 18, the safety belt 18 slides in the slot 42 and is subsequently displaced towards the transverse center plane $P_T$ to assumes a safety configuration in which the safety belt 18 occupies a portion of the slot 42 which is located towards the transverse center plane $P_T$. The slot 42 may be regarded as forming part of a compliant portion of the upper guide arrangement 20 in the FIGS. 8a and 8b embodiment.

Figure 9A:
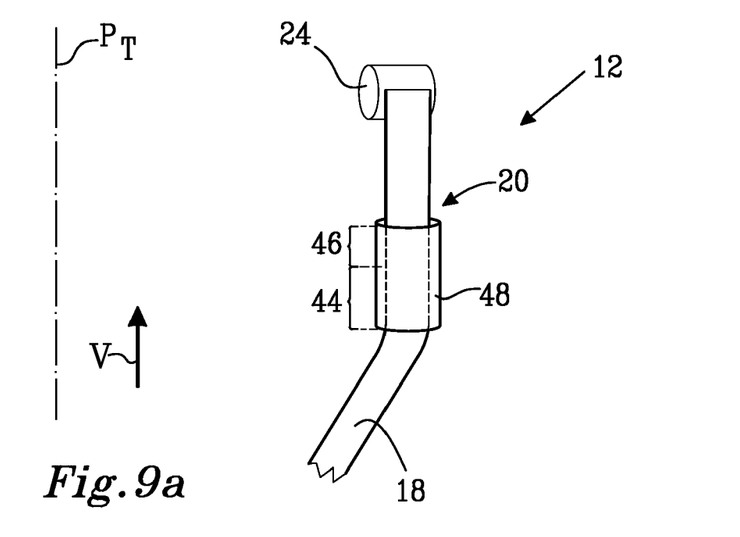
FIG. 9a-9b shows a portion of a further embodiment of an occupant restraint system.
Figure 9B:
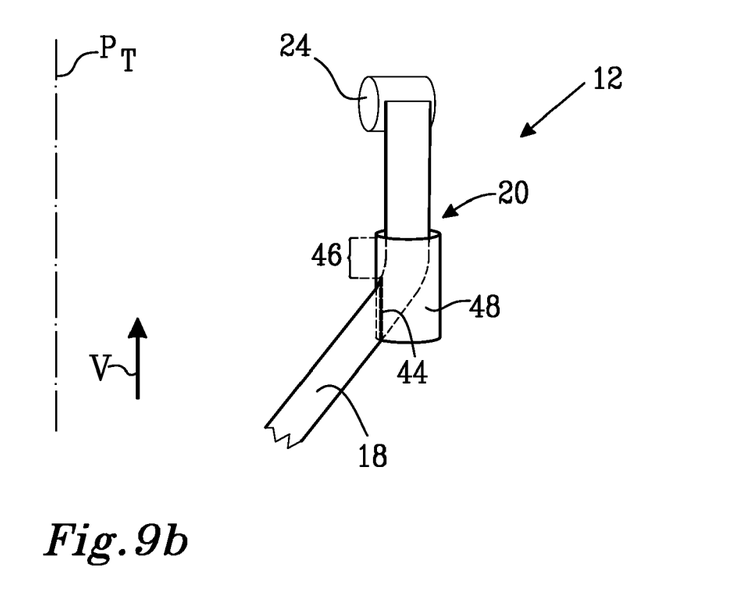

FIGS. 9a and 9b illustrate a portion of a further embodiment of an occupant restraint system comprising a first wall portion 44 adapted to be located between the belt 18 and the transverse center plane $P_T$. The first wall portion 44 is adapted to break or rupture when the safety belt tensioner 24 tensions the belt 18. In the implementation of the upper guide arrangement 20 illustrated in FIG. 9a, the first wall portion 44 forms part of a housing 48 through which a portion of the safety belt 18 extends. The first wall portion 44 preferably comprises a weakening such that it ruptures in a controlled manner when the safety belt tensioner 24 is activated. Purely by way of example, the first wall portion may comprise perforations (not shown) and/or notches. Moreover, and again purely by way of example, the housing 48 may be made of a plastic material. The first wall portion may extend throughout the vertical axis of the housing 48 or, as in the implementation of the housing 48 illustrated in FIG. 9a, it may extend through only a portion of the vertical axis of the housing 48. In the latter implementation, the housing 48 comprises an upper wall portion 46 which is stronger than the first wall portion 44. As such, the upper wall portion 46 is adapted not to rupture when the safety belt tensioner 24 tensions the belt.

FIG. 9b illustrates the present embodiment when the safety belt tensioner 24 tensions the belt 18. As may be seen in FIG. 9b, when the safety belt 18 is tensioned the first wall portion 44 ruptures such that the safety belt 18 assumes a safety configuration. The first wall portion 44 may be regarded as forming part of a compliant portion of the upper guide arrangement 20 in the FIGS. 9a and 9b embodiment.

Figure 10:
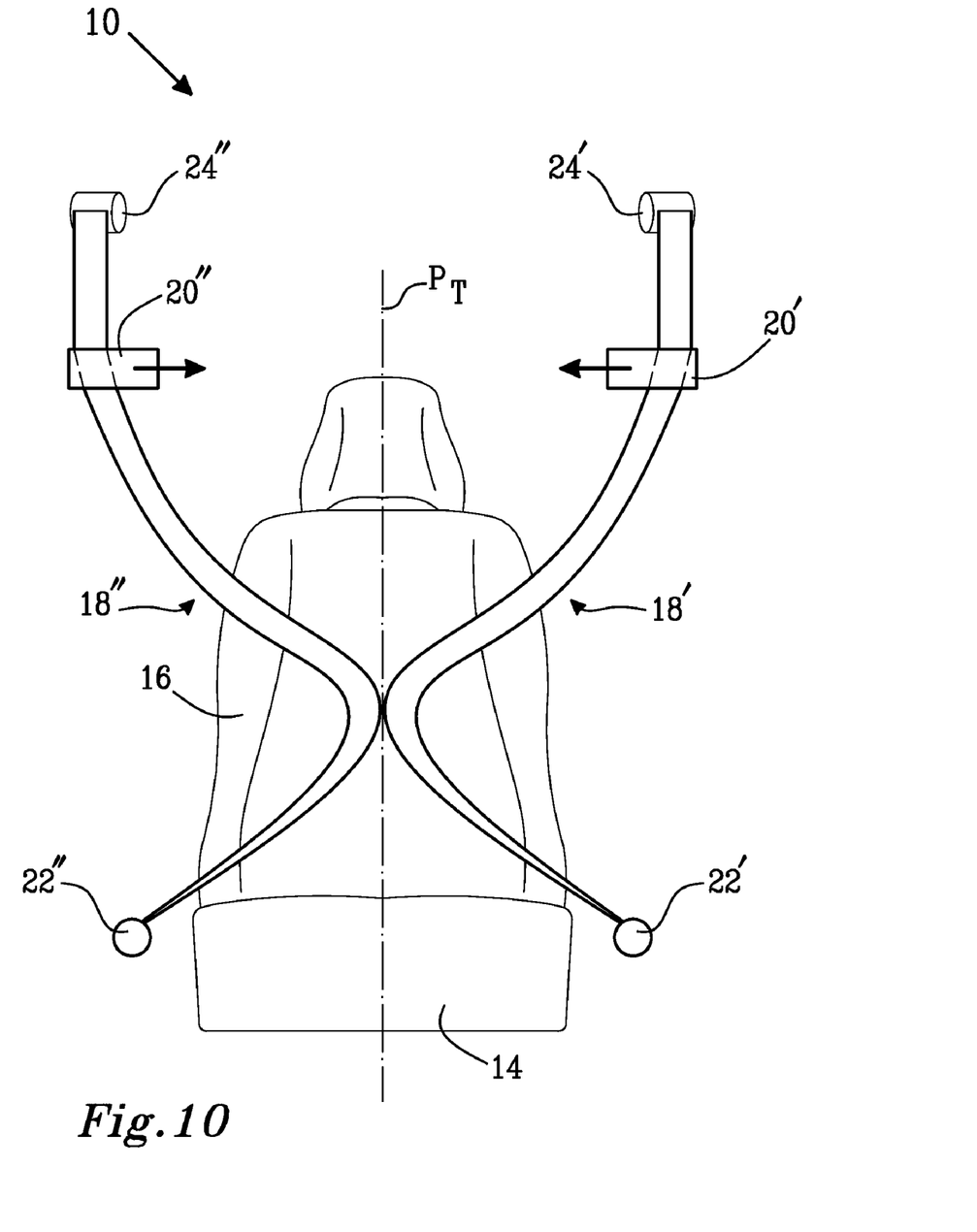
FIG. 10 shows an embodiment of a four-point occupant restraint system.

Furthermore, although the embodiments hereinabove relate to a three-point belt system, the invention is also applicable to other types of occupant restraint systems. To this end, reference is made to FIG. 10 illustrating an embodiment of the present invention. As may be seen in FIG. 10, the occupant restraint system 12 disclosed therein is a four-point belt system. The four-point belt system comprises two safety belts 18', 18", each one of which being connected to a separate safety belt tensioner 24', 24" and an upper guide arrangement 20', 20". Each of the safety belts 18', 18" includes a cross body portion extending between a respective upper guide arrangement 20', 20" and a connection point located near the transverse center plane $P_T$ of the seat 10. By means of an occupant restraint system according to the present disclosure, an appropriate comfort configuration of the safety belt may be obtained since, for instance, a diagonally extending portion of the safety belt may be located at a distance from an occupant's neck. However, in the event of a situation calling for more secure restraint of the seat occupant than that provided by the comfort condition, that portion of the safety belt is displaced towards the occupant's neck such that an appropriate safety configuration of the occupant restraint system is obtained. The occupant restraint system according to the present disclosure implies that the safety configuration may be assumed before the occupant of the seat hosting the occupant restraint systems begins to move forward during a rapid decoration of the vehicle, such as may occur during a crash.

Each one of the upper guide arrangements 20', 20" is adapted to allow a displacement of the corresponding safety belt 18', 18" towards the transverse center plane $P_T$ when the safety belt tensioners 24', 24" tensions the belts 18', 18". However, in other embodiments of the occupant restraint system 12 of the present invention, a four point safety belt may be provided with fewer or more safety belt tensioners and/or upper guide arrangements configured so as to displace a portion of the corresponding safety belt towards the transverse center plane $P_T$. Purely by way of example, only one 18' belt of a four point occupant restraint system 12 may be connected to an upper guide arrangements 20' adapted to allow the inward, i.e. towards the transverse center plane $P_T$, displacement of a safety belt portion.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

What is claimed is:

1. An occupant restraint system for a vehicle seat comprising:
   a belt having a shoulder-belt portion extending diagonally across the seat between an upper portion of a first side of the seat and a lower portion of a second side of the seat;
   a belt tensioner applying tension to the belt when activated by a safety sensor/control system;
   a support arm having an upper end adapted for mounting to vehicle structure above the upper portion of first side of the seat and extending downward toward the first side of the seat; and
   a guide member attached to a lower end of the support arm and engaging the belt to allow the belt to slide along the guide member during retraction and extension, the lower end of the support arm movable relative to the upper end such that when the belt tensioner applies tension to the belt, the guide member moves toward the seat in a direction having a component coinciding with transverse direction of the seat.

2. The occupant restraint system according to claim 1, wherein when the belt tensioner applies tension to the belt, the direction of movement of the guide member further has a component coinciding with a backward direction.

3. The occupant restraint system according to claim 1, wherein an amount of movement of the guide member is at least 0.2 times a width of the belt.

4. The occupant restraint system according to claim 1, further comprising a biasing element acting on at least one of the support arm and the guide member to resist movement of the guide member when the safety belt tensioner apples tension to the belt.

5. The occupant restraint system according to claim 4, wherein the biasing element comprises a torsion spring.

6. The occupant restraint system according to claim 1, wherein the support arm is adapted for pivoting mounting to the vehicle structure at a pivot point, the support arm rotating about a pivot point to allow the movement of the guide member.

7. The occupant restraint system according to claim 6, further comprising a biasing element applying a force to the support arm resisting movement of the guide member when the safety belt tensioner apples tension to the belt.

8. The occupant restraint system according to claim 7, wherein the biasing element comprises a torsion spring.

9. The occupant restraint system according to claim 1, wherein the support arm is adapted for non-pivoting mounting to the vehicle structure and is constructed to deflect to allow the movement of the guide member.

10. The occupant restraint system according claim 1, further comprising a locking member resisting movement of the support arm and adapted to break when the safety belt tensioner applies tension to the belt.

11. A seat assembly for a vehicle comprising:
   a seat for installation in the vehicle and having an first side and an second side;
   a belt having shoulder-belt portion extending diagonally across the seat;
   a belt tensioner applying tension to the belt when activated by a safety sensor/control system;
   a support arm having an upper end adapted for mounting to vehicle structure above an upper first portion of the seat and a lower end below the upper end; and
   a guide member attached to the lower end of the support arm and engaging the belt to allow the belt to slide along the guide member during retraction and extension, the lower end of the support arm movable relative to the upper end such that when the belt tensioner applies tension to the belt, the guide member moves toward the seat in a direction having a component coinciding with an inboard direction.

12. The seat assembly according to claim 11, wherein when the belt tensioner applies tension to the belt, the direction of movement of the guide member further has a component coinciding with a backward direction.

13. The seat assembly according to claim 11, wherein an amount of movement of the guide member is at least 0.2 times a width of the belt.

14. The seat assembly according to claim 11, further comprising a biasing element acting on at least one of the support arm and the guide member to resist movement of the guide member when the safety belt tensioner apples tension to the belt.

15. The seat assembly according to claim 14, wherein the biasing element comprises a torsion spring.

16. The seat assembly according to claim 11, wherein the support arm is adapted for pivoting mounting to the vehicle structure such that the support arm rotates about a pivot point above and on the first side of the seat to allow the movement of the guide member.

17. The occupant restraint system according to claim 16, further comprising a biasing element applying a force to the support arm resisting movement of the guide member when the safety belt tensioner applies tension to the belt.

18. The seat assembly according to claim 11, wherein the support arm is adapted for non-pivoting mounting to the vehicle structure and deflects to allow the movement of the guide member.

19. The seat assembly according claim 11, further comprising a locking member resisting movement of the support arm and adapted to break when the safety belt tensioner applies tension to the belt.

20. An occupant restraint system for a vehicle seat comprising:
   a belt having a shoulder-belt portion extending diagonally across the seat;
   a belt tensioner applying tension to the belt when activated by a safety sensor/control system;
   a support arm having an upper end adapted for pivoting mounting to vehicle structure at a pivot point above an upper outboard portion of the seat, the support arm extending downward from the pivot point;
   a guide member attached to a lower end of the support arm and engaging the belt to allow the belt to slide along the guide member during retraction and extension, the guide member movable along with the support arm between a comfort position wherein the guide member is relatively farther outboard of the seat and a safety position wherein the guide member is relatively closer to the seat; and
   a torsion spring located at the pivot point and applying a biasing force to the support arm urging the support arm toward the comfort position, the biasing force being overcome when the belt tensioner applies tension to the belt such that the guide member moves toward the safety position.

* * * * *

UNITED STATES PATENT AND TRADEMARK OFFICE
CERTIFICATE OF CORRECTION

PATENT NO. : 8,376,407 B2
APPLICATION NO. : 13/406802
DATED : February 19, 2013
INVENTOR(S) : Peter Adolfsson et al.

It is certified that error appears in the above-identified patent and that said Letters Patent is hereby corrected as shown below:

In the Claims

Column 11, Line 18, Claim 10:

After "The occupant restraint system according"
Insert -- to --.

Column 12, Line 19, Claim 19:

After "The seat assembly according"
Insert -- to --.

Signed and Sealed this
Eleventh Day of June, 2013

Teresa Stanek Rea
*Acting Director of the United States Patent and Trademark Office*